United States Patent
Chen et al.

(10) Patent No.: US 9,822,230 B2
(45) Date of Patent: Nov. 21, 2017

(54) NANOCELLULAR FOAM WITH SOLID FLAME RETARDANT

(71) Applicant: Dow Global Technologies LLC, Midland, MI (US)

(72) Inventors: Liang Chen, Midland, MI (US); Anne M. Kelly-Rowley, Midland, MI (US); Shana P. Bunker, Midland, MI (US); Stéphane Costeux, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/109,935

(22) PCT Filed: Mar. 18, 2015

(86) PCT No.: PCT/US2015/021135
§ 371 (c)(1),
(2) Date: Jul. 6, 2016

(87) PCT Pub. No.: WO2015/148193
PCT Pub. Date: Oct. 1, 2015

(65) Prior Publication Data
US 2017/0002162 A1    Jan. 5, 2017

Related U.S. Application Data

(60) Provisional application No. 61/971,656, filed on Mar. 28, 2014.

(51) Int. Cl.
| | |
|---|---|
| *C08J 9/00* | (2006.01) |
| *C08J 3/215* | (2006.01) |
| *C08J 9/12* | (2006.01) |
| *C08J 3/22* | (2006.01) |

(52) U.S. Cl.
CPC ............ *C08J 9/0038* (2013.01); *C08J 3/215* (2013.01); *C08J 3/226* (2013.01); *C08J 9/0004* (2013.01); *C08J 9/0061* (2013.01); *C08J 9/122* (2013.01); *C08J 2201/024* (2013.01); *C08J 2201/032* (2013.01); *C08J 2203/06* (2013.01); *C08J 2203/08* (2013.01); *C08J 2205/042* (2013.01); *C08J 2205/044* (2013.01); *C08J 2333/12* (2013.01); *C08J 2433/12* (2013.01)

(58) Field of Classification Search
CPC . C08J 3/215; C08J 3/226; C08J 9/0004; C08J 9/0038; C08J 9/0061; C08J 9/122; C08J 2201/024; C08J 2201/032; C08J 2203/06; C08J 2203/08; C08J 2205/042; C08J 2205/044; C08J 2333/12; C08J 2433/12
See application file for complete search history.

(56) References Cited

U.S. PATENT DOCUMENTS

| | | | |
|---|---|---|---|
| 8,349,531 B2 | 1/2013 | Young et al. | |
| 9,353,246 B2 | 5/2016 | Shankar et al. | |
| 2006/0229374 A1 | 10/2006 | Lee et al. | |
| 2012/0097907 A1* | 4/2012 | Bauer | C04B 14/064 252/602 |
| 2012/0193286 A1* | 8/2012 | Prissok | C08G 18/0852 210/510.1 |
| 2012/0276576 A1 | 11/2012 | Haddad et al. | |
| 2015/0225546 A1 | 8/2015 | Shankar et al. | |

FOREIGN PATENT DOCUMENTS

WO    2011066060    6/2011

\* cited by examiner

*Primary Examiner* — John Cooney
(74) *Attorney, Agent, or Firm* — Steven W. Mork

(57) ABSTRACT

Prepare nanofoam by (a) providing an aqueous solution of a flame retardant dissolved in an aqueous solvent, wherein the flame retardant is a solid at 23° C. and 101 kiloPascals pressure when in neat form; (b) providing a fluid polymer composition selected from a solution of polymer dissolved in a water-miscible solvent or a latex of polymer particles in a continuous aqueous phase; (c) mixing the aqueous solution of flame retardant with the fluid polymer composition to form a mixture; (d) removing water and, if present, solvent from the mixture to produce a polymeric composition having less than 74 weight-percent flame retardant based on total polymeric composition weight; (e) compound the polymeric composition with a matrix polymer to form a matrix polymer composition; and (f) foam the matrix polymer composition into nanofoam having a porosity of at least 60 percent.

8 Claims, No Drawings

NANOCELLULAR FOAM WITH SOLID FLAME RETARDANT

This invention was made with U.S. Government support under contract DE-EE0003916 awarded by the Department of Energy. The U.S. Government has certain rights in this invention.

BACKGROUND OF THE INVENTION

Field of the Invention

The present invention relates to a process for preparing nanocellular foam that contains a flame retardant that is solid at 23 degrees Celsius (° C.) and 101 kiloPascals pressure when in neat form.

Introduction

Polymeric foam having average cell sizes below one micrometer and one nanometer or larger are nanocellular foam, or simply nanofoam. The small cells of nanofoam inhibit thermal conduction through nanofoam, making nanofoam desirable as a thermal insulating material. When the cell size of foam is less than about one micrometer the gas conductivity decreases in that cell due to what is known as the Knudsen Effect. The Knudsen Effect is a phenomenon that results in a decrease in thermal conductivity as fewer gas molecules are available within each cell to collide and transfer heat within each single cell. The Knudsen Effect becomes significant as the cell size and connectivity between cells becomes on the same order of magnitude as the mean free path of the gas filling the cells. Thermal conductivity due to cell gas reduces almost in half when the cell size reduces from one micrometer to 300 nanometers, and reduces by almost ⅔ when the cell size reduces from one micrometer to below 100 nanometers.

However, it is challenging to prepare polymeric nanofoam of low enough density and large enough dimensions to make the nanofoam economically viable. Retaining nanometer sized cells requires stabilizing the small cells from coalescing into more stable larger cells during the foaming process. Additives, especially solid particulate additives, tend to destabilize the small cells and encourage coalescence into larger cells.

To be valuable for building applications, nanofoam must meet stringent flame retardant requirements. Flame retardancy in polymeric foam is typically achieved by incorporating flame retardant into the polymer matrix that is expanded into polymeric foam. Halogenated flame retardants are commonly used in polymeric foam.

Phosphorous flame retardants have been under recent investigation as an alternative, halogen-free flame retardant option for polymeric foam. For example, aluminum tris (2-(diethyoxyphosphoryl) acetate) ("FR-478") is one material that has shown promise as a halogen-free flame retardant for polymeric articles, particularly those comprising acrylic polymers. FR-478 is a solid material that is not readily soluble in polymers suitable for preparing polymeric foam. Therefore, preparing nanofoam from resins compositions containing FR-478 has not been achievable because the solid additive destabilizes formation of nanometer sized cells.

It would advance the state of the art for nanofoam to discover how to incorporate a flame retardant that is solid at 23° C. and 101 kiloPascals pressure when in neat form, especially a halogen-free flame retardant such as FR-478, into the nanofoam, especially while achieving porosity values of at least 60 percent to achieve a desirably low foam density.

BRIEF SUMMARY OF THE INVENTION

The present invention provides a process for preparing nanofoam containing flame retardants that are solid at 23° C. and 101 kiloPascals pressure when in neat form ("solid" flame retardants), such as FR-478, and achieving porosity values of at least 60 percent.

The present invention is a result of discovering a means for dispersing the solid flame retardant in a polymer resin at minute flame retardant particle sizes within the resin. As a result, the particles are less destabilizing to nanometer cells than larger particle sizes achievable by mechanical grinding or fracturing of the solid flame retardant material.

The present invention is useful for preparing nanofoam containing solid flame retardant, especially flame retardant that is insoluble in the polymer resin of the nanofoam matrix and, most desirably, FR-478. The process prepares the foam of the present invention.

In a first aspect, the present invention is a process for preparing nanofoam comprising the following steps: (a) providing an aqueous solution of a flame retardant dissolved in an aqueous solvent, wherein the flame retardant is a solid at 23° C. and 101 kiloPascals pressure when in neat form; (b) providing a fluid polymer composition selected from a solution of polymer dissolved in a water-miscible solvent or a latex of polymer particles in a continuous aqueous phase; (c) mixing the aqueous solution of flame retardant with the fluid polymer composition to form a mixture; (d) removing water and, if present, solvent from the mixture to produce a polymeric composition having less than 74 weight-percent flame retardant based on total polymeric composition weight; (e) compound the polymeric composition with a matrix polymer to form a matrix polymer composition; and (f) foam the matrix polymer composition into nanofoam having a porosity of at least 60 percent.

In a second aspect, the present invention is a nanofoam comprising a flame retardant in a polymer matrix, the polymer matrix defining a plurality of cells having an average cell size of less than one micrometer and a porosity of at least 60 percent and wherein the flame retardant is a solid at 23° C. and 101 kiloPascals pressure when in neat form.

DETAILED DESCRIPTION OF THE INVENTION

"And/or" means "and, or alternatively". All ranges include endpoints unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

The process of the present invention includes providing an aqueous solution of a flame retardant dissolved in an aqueous solvent.

The flame retardant of the present invention is a solid at 23° C. and 101 kiloPascals pressure when in neat form. Neat form means pure and free of solvents or plasticizers.

The flame retardant is soluble in aqueous solvent. Aqueous solvent includes water and any miscible combination of water and one or more than one cosolvent. Examples from which the one or more than one cosolvent can be selected from include methanol and ethanol. Typically, the aqueous solvent is 50 volume-percent (vol %) or more water based on total aqueous solvent volume. The aqueous solvent can be 75 vol % or more, 80 vol % or more, 85 vol % or more, 90 vol % or more, 95 vol % or more, 99 vol % or more and even 100 vol % water based on total aqueous solvent volume.

The flame retardant is at least partially soluble, and is desirably entirely soluble in an aqueous solvent. Desirably, the flame retardant is at least partially soluble, and more desirably is entirely soluble in water. Determine solubility in aqueous solvent at 101 kPa pressure and 25° C.

Desirable flame retardants for use in the present invention include one or more than one aluminum carboxylate salts having the following formula: $Al[OCO(CH_2)_nP(O)(OR_1)(OR_2)]_3$ where $R_1$ and $R_2$ are hydrocarbyl groups that can optionally be joined and n is independently an integer between one and two as well as tris (2-(diethyoxyphosphoryl) acetate, also known as "FR-478". FR-478 is a particularly desirable flame retardant for use in the present invention.

The aqueous solution of flame retardant dissolved in aqueous solvent desirably contains 2 weight-percent (wt %) or more, preferably 2.5 wt % or more, still more preferably 3 wt % or more, even more preferably 4 wt % or more, still even more preferably 5 wt % or more and can be 6 wt % or more, 7 wt % or more, 8 wt % or more and even 9 wt % or more while at the same time is generally 12 wt % or less, preferably 11 wt % or less, and can be 10 wt % or less, 9 wt % or less, 8 wt % or less, 7 wt % or less and even 6 wt % or less of dissolved flame retardant based on total weight of the aqueous solution of flame retardant. Preferably, the aqueous solution of flame retardant is free of undissolved flame retardant.

The process also requires providing a fluid polymer composition selected from a solution of polymer dissolved in a water-miscible solvent or a latex of polymer particles in a continuous aqueous phase. The fluid polymer composition can be either polymer dissolved in a water miscible solvent or a latex of polymer particles in a continuous aqueous phase, or a combination of both.

A polymer that is "dissolved in a water-miscible solvent" can be entirely dissolved in the solvent or partially dissolved in the water-miscible solvent. Desirably, most of the polymer is dissolved and preferably all of the polymer is dissolved in the water miscible solvent. "Water-miscible solvent' includes any solvent or combination of solvents selected from a group consisting of water and liquids that intermix with water on a molecular level. Examples of liquids that intermix with water on a molecular level include any one or more than one material selected from methanol, ethanol, acetone, and tetrahydrofuran.

In the broadest scope of the present invention, the polymer dissolved in the water-miscible solvent can be any polymer that is at least partially soluble in the water-miscible solvent and preferably is entirely soluble in the water miscible solvent. The polymer can be partially, or even entirely, soluble in water. Desirably, the polymer is selected from acrylate polymers include any one or combination of more than one selected from polymethylmethacrylate (PMMA), methyl methacrylate/ethyl acrylate copolymer (MMA-co-EA), methyl methacrylate/methyl acrylate (MMA-co-MA) copolymer, methyl methacrylate/butyl methacrylate (MMA-co-BMA) copolymer, methyl methacrylate/ethyl methacrylate copolymer (MMA-co-EMA), methyl methacrylate/vinyl acetate copolymers, methyl methacrylate/vinyl acetate/ethyl acrylate copolymers, and essentially any copolymer of methyl methacrylate with acrylate or methacrylate monomers.

The concentration of polymer dissolved in the water-miscible solvent is typically one weight-percent (wt %) or more, preferably two wt % or more and can be 2.5 wt % or more while at the same time typically 20 wt % or less, preferably 10 wt % or less and can be five wt % or less.

The latex of polymer particles in a continuous aqueous phase comprises discrete phases of polymer (polymer particles) dispersed in an aqueous phase. The aqueous phase typically is water, but can be water with other water-miscible fluids and/or water-miscible components present. The concentration of latex polymer particles in the continuous aqueous phase is desirably five wt % or more, preferably 10 wt % or more and can be 20 wt % or more while at the same time is typically 65 wt % or less, preferably 50 wt % or less and can be 40 wt % or less or even 30 wt % or less based on total latex weight. At the same time, the volume average particle size of the polymer particles in the latex is desirably 30 nanometers or more, preferably 40 nanometers or more, more preferably 50 nanometers or more while at the same time typically 500 nanometers or less, preferably 200 nanometers or less and can be 100 nanometers or less. Determine volume average particle size using the following Laser Light Diffraction method. First prepare a sample by diluting the latex to one wt % solids with deionized water and then vortexing for 30 seconds two times. Determine volume average particle size of the latex using a Beckman Coulter LS13 320 Laser Light Diffraction Particle Size analyzer (Beckman Coulter Corporation) using an optical model predetermined by the instrument software.

The polymer particles in the latex can, in the broadest scope of the present invention, comprise any polymer but is desirably selected from a group consisting of copolymers of styrene and acrylonitrile (SAN) and acrylate polymer. Suitable acrylate polymers include any one or combination of more than one selected from polymethylmethacrylate (PMMA), methyl methacrylate/ethyl acrylate copolymer (MMA-co-EA), methyl methacrylate/methyl acrylate (MMA-co-MA) copolymer, methyl methacrylate/butyl methacrylate (MMA-co-BMA) copolymer, methyl methacrylate/ethyl methacrylate copolymer (MMA-co-EMA), methyl methacrylate/vinyl acetate copolymers, methyl methacrylate/vinyl acetate/ethyl acrylate copolymers, and essentially any copolymer of methyl methacrylate with acrylate or methacrylate monomers.

The process requires mixing the aqueous solution of flame retardant with the fluid polymer composition to form a mixture. Desirably, this step achieves a homogenous mixture of the flame retardant solution in the fluid polymer composition to disperse the flame retardant as thoroughly around the polymer in the fluid polymer composition as possible. In general, there is no limitation on how the mixing is done. Mixing can be in a continuous process or a batch process. Examples of continuous processes include flowing the aqueous solution of flame retardant and fluid polymer composition together through a tube with static mixers, subjecting a combined flow of aqueous solution of flame retardant and fluid polymer composition to active mixing elements, by impingement mixing of streams of aqueous solution of flame retardant and fluid polymer composition, or any combination of two or more of these processes. Mixing can also be done by a batch process, or as a continuous process in combination with a batch process. Batch mixing can be done, for example, by stirring a mixture of aqueous solution of flame retardant and fluid polymer composition in a container using a mixing blade. Regardless of the method of mixing, it is desirable to have as homogeneous of a mixture of flame retardant and polymer from the fluid polymer composition as possible.

After forming the mixture of aqueous solution of flame retardant and fluid polymer composition, remove water and, if present, solvent from the mixture to produce a polymeric composition (or "masterbatch"). The polymeric composition comprises the polymer from the fluid polymer composition with flame retardant from the aqueous solution of flame retardant dispersed on the polymer, within the polymer, or both on and within the polymer. When the fluid polymer composition is a latex, flame retardant becomes coated on the polymer particles of the latex upon removing the water from the mixture. If the polymer particles of the latex irreversibly coalesce during drying then the flame retardant becomes dispersed within the resulting polymer mass. However, it is desirable to remove water (and solvent if present) from a mixture that comprises latex under temperature and pressure conditions that avoid coalescence of the latex particles—that is, the latex particles do not indistinguishably coalesce, though they may agglomerate into clusters of particles. In such a situation where the latex particles do not indistinguishably coalesce, the flame retardant coats the polymer particles of the latex rather than becoming dispersed within a polymer mass. As a result, the flame retardant is conveniently disposed as a thin coating on nanometers sized polymer particles, and subsequently further dispersed in the matrix polymer of the foam. When the fluid polymer composition comprises a solution of polymer dissolved in a water-miscible solvent, the flame retardant becomes dispersed within the polymer mass resulting from removing water and solvent.

Remove water and, if present, solvent (collectively "continuous phase") from the mixture by any means known including those selected from continuous and batch methods. Desirably, remove the continuous phase by evaporation, optionally under vacuum. One method for removing continuous phase from the mixture is by disposing the mixture into a container (for example, a pan or trough) and allow the continuous phase to evaporate, optionally with application of heat. For example, the mixture can be continuously flowed through a heated trough to boil off continuous phase as it flows. Another method for removing continuous phase is by spray drying the mixture and recovering the solids. Spray drying is particularly convenient in combination with impingement mixing of the aqueous solution of flame retardant and the fluid polymer composition to form the mixture just prior to spray drying the mixture.

Removing the continuous phase from the mixture provides a polymer composition. The flame retardant concentration in the polymer composition is desirably 10 weight-percent (wt %) or more, preferably 15 wt % or more, more preferably 20 wt % or more, even more preferably 30 wt % or more, and can be 40 wt % or more, 50 wt % or more or 60 wt % or more while at the same time is typically less than 75 wt %, preferably 74 wt % or less, more preferably 70 wt % or less, and still more preferably 60 wt % or less and can be 50 wt % or less based on the total weight of polymer composition. One of ordinary skill can select ratios of aqueous solution of flame retardant and fluid polymer composition to prepare mixtures that will result in such a polymer composition. This resulting polymer composition is, in essence, a "masterbatch" of flame retardant for further compounding into a polymer for foaming.

Compound the resulting polymer composition with a matrix polymer to form a matrix polymer composition. Compounding involves mixing to desirably form a homogeneous mixture of the polymer composition and matrix polymer. One of ordinary skill understands how to compound a polymeric material such as the polymer composition with another polymer such as the matrix polymer. Examples of suitable means for compounding include melt blending.

The matrix polymer is desirably miscible with the polymer of the fluid polymer composition. Miscible means sufficiently compatible to be able to mix at a molecular level. The matrix polymer can comprise or consist of the same polymer or polymers as the fluid polymer composition or different polymer or polymers from the polymer of the fluid polymer composition. Desirably, the matrix polymer is selected from a group consisting of copolymers of styrene and acrylonitrile (SAN) and acrylate polymer. Examples of suitable acrylate polymers include one or any combination of more than one acrylate polymer selected from a group consisting of polymethylmethacrylate (PMMA), methyl methacrylate/ethyl acrylate copolymer (MMA-co-EA), methyl methacrylate/methyl acrylate (MMA-co-MA) copolymer, methyl methacrylate/butyl methacrylate (MMA-co-BMA) copolymer, methyl methacrylate/ethyl methacrylate copolymer (MMA-co-EMA), methyl methacrylate/vinyl acetate copolymers, methyl methacrylate/vinyl acetate/ethyl acrylate copolymers, and essentially any copolymer of methyl methacrylate with acrylate or methacrylate monomer.

It is desirable to compound the polymeric composition and matrix polymer in a ratio such that the concentration of flame retardant in the resulting matrix polymer composition is sufficient to achieve a phosphorous concentration in a range of 1-3 wt % relative to total polymer composition weight.

A surprising aspect of the present invention is that preparation of the matrix polymer composition up to this point results in such a fine flame retardant particle size in the matrix polymer composition so that the flame retardant does not hinder the formation of high porosity (60 percent or higher) nanofoam.

Foam the matrix polymer composition into a nanofoam having a porosity of at least 60 percent, preferably 65 percent or more and more preferably 70 percent or more. Accomplish the foaming step by any known method for preparing nanofoam having a porosity in the necessary and desired range. For example, a typical method for foaming the matrix polymer composition includes pressuring a mixture of carbon dioxide and the matrix polymer composition under temperature and pressure conditions sufficient to dissolve carbon dioxide into the matrix polymer, preferably so that the carbon dioxide is in a supercritical state, to form a foamable polymer composition and then depressurizing the foamable polymer composition to cause the foamable polymer composition to expand into foam (that is, to foam). Typically the pressure right before foaming is ten MegaPascals (MPa) or higher, preferably 20 MPa or higher and more preferably 30 MPa or higher. Depressurizing to foam is generally done at a rate of at least 100 megaPascals per second (MPa/s) or higher, preferably 500 MPa/s or higher and more preferably one gigaPascal per second or higher. Desirably, foaming step occurs at a temperature of 60° C. or cooler.

The resulting polymer foam has an average cell size of less than one micrometer and a porosity of at least 60 percent. The average cell size can be 750 nanometers or less, and even 500 nanometers or less, 300 nanometers or less, 250 nanometers or less, 200 nanometers or less, even 100 nanometers or less. At the same time, the porosity is desirably 65 percent or more, preferably 70 percent or more and can be 75 percent or more, 80 percent or more and even 90 percent or more.

Measure the average cell size of a foam as the number-average cell size using the following method. Prepare a cross section of the polymer foam by cryo-fracturing the foam. Examine a representative portion of the cross section by scanning electron microscopy (SEM), where the representative portion has dimensions in a range of two micrometers by two micrometers to twenty micrometers by twenty micrometers. Measure the cell size (distance across the cell, e.g., diameter) of 50-200 random cells in the portion of the cross section. Determine the average of all measured sizes to obtain the average cell size of the foam.

The porosity of a foam characterizes the extent of void volume in the foam. Polymeric foam comprises a polymer matrix that defines within it multiple cells. The volume of a foam's cells corresponds to the void volume in the foam. Determine porosity of a foam as a percentage (p %) from the density of the foam ($\rho_f$) and the density of the polymer matrix material (all non-void material) of the foam ($\rho_m$) using the following equation:

$$p\% = [1-(\rho_f)/(\rho_m)] \times 100\%$$

Determine the density of the polymeric foam article ($\rho_f$) by the Archimedes method of ASTM method D-1622-03. Polymeric foam articles of the present invention desirably have a foam density of less than 0.4 grams per cubic centimeters (g/cm$^3$), and can have a density of 0.3 g/cm$^3$ or less, 0.2 g/cm$^3$ or less or even 0.18 g/cm$^3$ or less.

The present invention provides a method for preparing nanofoam and a resulting nanofoam that has a porosity of 60 percent or more and that comprises a flame retardant that is solid at 23° C. and 101 kiloPascals pressure when in neat form. A process for preparing such foam, and hence such foam, is difficult to prepare due to the presence of the solid flame retardant. To the inventor's knowledge, the present process is the only process for preparing such foam.

EXAMPLES

Table 1 identifies the materials for use in preparing the subsequent Examples (Exs) and Comparative Examples (Comp Exs).

TABLE 1

| Component | Description |
|---|---|
| FR478 | aluminum tris (2-(diethyoxyphosphoryl) acetate). A method for synthesizing this material is available in WO/2014/062411A1. |
| MMA-co-EA | Copolymer of methyl methacrylate and 8.9 wt % ethyl acrylate based on polymer weight. Polymer has a glass transition temperature of 95.3° C. and a melt flow rate of 10 decigrams per minute according to ASTM D1238 (3.8 kg/230° C. conditions). Available as "VM100" from Arkema. |
| MMA-co-BMA Latex | A latex of polymer particles comprising a copolymer of 65 wt % methylmethacrylate and 35 wt % butyl methacrylate. Prepare the latex as described below. |

MMA-Co-BMA Latex Synthesis

Pre-charge a reaction vessel with deionized water and BASF DISPONIL™ FES 32 surfactant (4 wt % relative to DI water weight) and heat to 85° C. while continuously stirring. Add a pH buffer (1 weight-part sodium carbonate for 20 weight-parts on deionized water) into the vessel (1 weight-part buffer for 25 weight-parts of initial surfactant solution).

Prepare a monomer emulsion that is 3.2 times the size of the reaction vessel pre-charge, consisting of 23 wt % deionized water, 0.6 wt % DISPONIL FES 32 surfactant, 26.8 wt % butyl methacrylate and 49.6 wt % methyl methacrylate. Add 0.15 wt % N-dodecyl mercaptan.

Add 3.8% of the monomer emulsion mass into the reaction vessel to seed the reaction, and inject a solution of sodium persulfate and deionized water (The ratio of sodium persulfate to deionized water is 1.0 weight-parts to 10 weight-parts). The mass of this solution is 30% of the mass of the seed monomer emulsion.

Dropwise add the rest of the monomer emulsion into the reaction vessel over one hour. Add sodium persulfate in deionized water (0.5 weight-parts per 30 weight-parts respectively) with the monomer emulsion. The feed rate for the sodium persulfate solution is 6.3 percent of the feed rate of the MMA by mass. Add deionized water (1 weight-part for 4 weight-parts of monomer emulsion) 50 minutes into the monomer emulsion addition.

Upon reaching the desired mass of polymer, cool the kettle to 75° C. Inject a blend of iron (II) sulfate hepahydrate in deionized water (0.15 wt % solution with 6 drops of sulfuric acid added per 500 milliliters (mL) of solution), ethylenediaminetetraacetic acid (EDTA) tetrasodium salt (one wt % in deionized water) at a ratio of 25 weight-parts iron (II) sulfate solution to 8 weight-parts EDTA salt solution. The mass of the iron (II) sulfate and EDTA solution to mass of MMA feed is 0.7 wt %. After 20 min, add concurrently a 70% solution of t-butyl hydroperoxide in deionized water (0.3 weight-parts per 10 weight-parts respectively) and a solution of isoascorbic acid in deionized water (0.15 weight-parts per 10 weight-parts respectively), each at a loading of 2.1 wt % per initial mass of MMA. Start cooling the reactor to approximately 40° C. During cooling, and upon reaching 65° C., repeat addition of the same t-butyl hydroperoxide and isoascorbic acid solutions in the same proportions. Filter emulsion polymer latex through a 100 mesh screen to obtain latex of 49% solids. The final polymer has a molecular weight of 76,000 Mn and 160,000 Mw and a glass transition temperature of 87° C. The latex has a volume-average particle size of 100 nanometers as determined by the Laser Light Diffraction method described herein.

Masterbatch Preparation

Comp MB(a)

Use as a reaction vessel a 1000 milliliter (mL) three neck round bottom flack fitted with a mechanical stirrer, glass stopper and a condenser with a nitrogen inlet. Charge the vessel with diethyl phosphonoacetic acid (50 mL) followed by addition of water (400 mL) and aluminum hydroxide monohydrate (9.21 grams). Heat the resulting solution to reflux and hold at that temperature for eight hours to obtain an aqueous solution having a concentration of 11.4 wt % FR-478 based on aqueous solution weight. Remove the water using a rotoevaporator to leave behind a solid material. Add 200 mL of acetone to help remove water and extract out any un-reacted aluminum hydroxide. Isolate the solid by vacuum filtration using a Buchner funnel and wash with additional water and acetone (three times each with 200 mL each time) to clean the solid product. Transfer the solid product to a glass bottle and place in a vacuum oven to dry overnight. The yield of solid product is 46 grams. The solid product is an aluminum carboxylate salt of the present invention having the formula: $Al[OCO(CH_2)_1P(O)(OC_2H_5)_2]_3$. Break up the resulting solid product using a mortar and pestle to obtain a flowable powder. The resulting powder is Comp MB(a).

Comp MB(b)

Mill 20 grams of the flowable powder of Comp MB(a) with a Spex 8510 Shatterbox. Grind the powder sample and homogenize for 20 minutes in a tungsten carbide container in the presence of a tungsten carbide puck. The resulting material is Comp MB(b).

Comp MB(c)

Prepare an 11.4 wt % aqueous solution of FR478 as described for MB(a) or dissolve FR478 into water to prepare an aqueous solution at a concentration of 11.4 wt % FR478 based on aqueous solution weight. Dissolve PMMA into acetone to form a fluid polymer composition having a PMMA concentration of 2.5 wt % based on total fluid composition weight. Mix the aqueous solution of FR478 with the fluid polymer composition and spray dry the resulting mixture by feeding both through nozzles of a four-fluid nozzle atomizer (Fujisaki Electric) that is equipped on a Mobile Minor spray dyer (GEA Process Engineering Inc.). Use a 620 kiloPascal (kPa) (90 pounds per square inch (psi)) nitrogen pressure on the nozzle atomizer with a total flow rate of 80 liters per minute (L/min). Feed the aqueous solution of FR478 at a flow rate of 4.5 milliliters per minute (mL/min) and the fluid polymer composition at a flow rate of 8-10 mL/min into the nozzle atomizer simultaneously using peristaltic pumps. Use an inlet temperature of 110° C. and outlet temperature of 54° C. Collect in the cyclone of a drier the spray-dried powder as MB(c), which has a volume mean particle size of 10 micrometers.

MB(1)

Prepare an 11.4 wt % FR478 aqueous solution and mix with a four-fold excess of acetone. Dilute the PMMA Latex to a 10.0 wt % solid concentration with water to prepare a fluid polymer composition. Mix the FR478 solution and fluid polymer composition together and spray dry the resulting mixture in a similar manner as Comp MB(c) except use a total flow rate of 110 L/min, FR478 solution flow rate of 10 mL/min and fluid polymer composition flow rate of 7.5 mL/min, inlet temperature of 130° C. and outlet temperature of 50° C. The resulting powder has a volume mean particle size of 4.9 micrometers and form agglomerated latex particles coated with FR478.

MB(2)

Prepare MB(2) in a similar manner as MB(1) except modified as follows: use a 11.4 wt % aqueous FR478 solution, total flow rate of 80 L/min, FR478 solution flow rate of 4.5 mL/min, fluid polymer composition flow rate of 5 mL/min, inlet temperature of 120° C. and outlet temperature of 54° C. The resulting powder has a volume mean particle size of 8.0 micrometers and form agglomerated latex particles coated with FR478.

MB(3)

Prepare MB(3) in a similar manner as MB(1) except modified as follows: use a 5 wt % aqueous FR478 solution prepared by dilution of an 11.4 wt % solution as described above, a total flow rate of 110 L/min, an FR478 solution flow rate of 5 mL/min, a fluid polymer composition flow rate of 5 mL/min, an inlet temperature of 110° C. and an outlet temperature of 55° C. The resulting powder has a volume mean particle size of 6.5 micrometers and form agglomerated latex particles coated with FR478.

MB(4)

Prepare 150 grams of an aqueous solution of flame retardant that is a 5 wt % solution of FR478 in water. For the fluid polymer composition use 150 grams of PMMA latex that has been diluted with water to 20 wt % solids. Slowly add the aqueous solution of flame retardant into the fluid polymer composition while agitating the fluid polymer composition using an overhead mixer at 1200 revolutions per minute. The latex particles flocculate into agglomerates. Pan dry the resulting mixture at approximately 25° C. Grind the resulting polymer composition using a food processor to form a free flowing powder. Further dry the free flowing powder in a vacuum over at approximately 25° C. to remove residual moisture. The resulting powder comprises polymer particles coated with FR478.

MB(5)

Prepare 165 grams of an aqueous solution of flame retardant that consists of 5 wt % FR478 in water. For the fluid polymer composition use 153.8 grams of the PMMA latex that has been diluted with water to 20 wt % solids. Slowly add the aqueous solution of flame retardant to the fluid polymer composition while mixing with an overhead mixer at 1800 revolutions per minute. The resulting polymer mixture comprises latex particles agglomerate to have a volume mean particle size of 3.9 micrometers. Spray dry the resulting mixture using a two fluid nozzle atomizer equipped on a Mobile Minor spray dyer (GEA Process Engineering Inc.). Use a nitrogen pressure of 103 kPa (15 psi) and flow rate of 6 kilograms per hour. Feed the polymer mixture into the nozzle at a rate of 20 mL/min using a peristaltic pump. The inlet temperature is 140° C. and outlet temperature is 55° C. The resulting spray dried powder is collected by the cyclone of the dryer and has a volume mean particle size of 7.8 micrometers. The resulting powder comprises polymer particles coated with FR478.

Compounding

Compound the masterbatch (polymeric composition) as identified in Table 2 with MMA-co-EA as a matrix polymer to form a matrix polymer composition. The concentration of polymeric composition in the matrix polymer composition is indicated in Table 2. Prepare 50 grams of matrix polymer composition and mold the matrix polymer composition into plaques at 180° C. and a force of 66.7 kiloNewtons for ten minutes.

For Comparative Examples A-C and Examples 1-5, compound using a batch small-scale extensional mixer from Randcastle Extrusion System, Inc. The mixer has a rotary mixing element, such as the one described in U.S. Pat. No. 6,962,431 that is driven by a motor inside a cylindrical cavity. The rotor diameter is 25 millimeters with a length-to-diameter ratio (L/D) equal to four. Clearances between the rotor and cavity walls are one millimeter. The cavity is equipped with a die gate to allow sample retrieval. Heat the mixing cavity to 180° C. Prepare 10 grams of dry blend of the polymer matrix and the polymer composition (master batch). Add the dry blend to the feed port of the mixer and push it in the mixer with a feeding ream over approximately one minute. Process blend at 180° C. for 10 minutes at a rotor speed of 60 revolutions per minute. After mixing, stop the rotor and open the die gates. Restart the rotor to induce extrusion of a molten strand of five to six cubic centimeters. Collect the strand and allow to cool to approximately 23° C.

For Example 6, compound using low-shear Haake Rheocord™ 90/900 compounder. Heat the bowl to 180° C. and add the matrix polymer while mixing under low revolutions per minute. Once the matrix polymer melts add the polymer composition (master batch). Blend for 10 minutes at 60 revolutions per minute. Cool the resulting matrix polymer composition with a nitrogen gas flow while blending to prevent oxidation.

Compression mold the matrix polymer compositions at 200° C. and 8.6 MegaPascals pressure for two minutes into a plaque having a thickness of 1.5 millimeters to form a polymer sheet. Cut the plaque into pieces having a width of four to six millimeters and a length of 20 millimeters for use in the foaming process.

Foaming

Foam the matrix polymer composition by charging a piece of the plaque into a 50 mL, high pressure cylindrical vessel, heat the vessel to 35° C. and pressurize for two hours with carbon dioxide at a pressure of 30 MPa. Depressurize the vessel at a rate of approximately two GigaPascals per second. The matrix polymer composition expands into polymeric foam.

Characteristics of the foams of Comparative Examples A-C and Examples 1-6 are in Table 2 and an interpretation of the results follows Table 2. "FR" refers to "flame retardant". "MB" refers to "master batch"

TABLE 2

| Sample | Master Batch | wt % FR in Master Batch[a] | Wt % MB in Matrix Polymer Composition | wt % FR in Foam[b] | Foam Porosity (%) | Average Cell Size (nm) |
|---|---|---|---|---|---|---|
| Comp Ex A | Comp MB(a) | 100 | 19.7 | 19.7 | 67 | 2000 |
| Comp Ex B | Comp MB(b) | 100 | 19.7 | 19.7 | 66 | 6500 |
| Comp Ex C | Comp MB(c) | 74 | 26.7 | 19.8 | 64 | 1150 |
| Ex 1 | MB(1) | 19 | 34.6 | 6.6 | 68 | 340 |
| Ex 2 | MB(2) | 51 | 38.7 | 19.7 | 84 | 370 |
| Ex 3 | MB(3) | 27 | 24.4 | 6.6 | 68 | 400 |
| Ex 4 | MB(4) | 21 | 31.3 | 6.6 | 68 | 390 |
| Ex 5 | MB(5) | 20 | 32.9 | 6.6 | 68 | 330 |
| Ex 6 | MB(5) | 20 | 32.9 | 6.6 | 66 | 300 |

[a]weight percent flame retardant based on total polymer composition (master batch) weight.
[b]weight percent flame retardant based on total polymer foam weight.

Effect of Master Batch

Comp Exs A, B and C illustrate an inability to prepare nanofoam from a solid flame retardant by trying to compound the solid flame retardant directly into a matrix polymer, even after milling the solid flame retardant to attempt to obtain small particulate sizes.

Exs 1-6 reveal that the same solid flame retardant used in Comp Exs A, B and C, and at both higher and lower total flame retardant concentration in the final foam, can produce nanofoam when processed according to the present invention. It is believed that the present invention distributes the solid flame retardant as minute particles, particles smaller than milling can achieve, in the matrix polymer composition so that the solid flame retardant particles do not interfere with formation of high porosity nanofoam.

Effect of Flame Retardant Concentration in the Master Batch

Each of the Comparative Examples (Comp Exs A-C) has a concentration of flame retardant of 74 wt % or higher in the masterbatch that is compounded with the matrix polymer to form the matrix polymer composition for foaming. Each of those Comparative Examples end up forming foam with an average cell size greater than one micrometer.

In contrast, each of the examples uses the same flame retardant but at a concentration below 74 wt % in the master batch. Even though the Example foams contain a range of final flame retardant concentrations in the resulting foam that are greater than and less than that of the Comparative Examples, each Example foam has an average cell size below one micrometer and actually below 500 nanometers. Therefore, the concentration of flame retardant in the masterbatch should be below 74 wt % in order to achieve nanofoam.

The invention claimed is:

1. A process for preparing nanofoam comprising the following steps:
   (a) providing an aqueous solution of a flame retardant dissolved in an aqueous solvent, wherein the flame retardant is a solid at 23° C. and 101 kiloPascals pressure when in neat form;
   (b) providing a fluid polymer composition selected from a solution of polymer dissolved in a water-miscible solvent or a latex of polymer particles in a continuous aqueous phase;
   (c) mixing the aqueous solution of flame retardant with the fluid polymer composition to form a mixture;
   (d) removing water and, if present, solvent from the mixture to produce a polymeric composition having flame retardant present at a concentration of less than 74 weight-percent based on total polymeric composition weight;
   (e) compounding the polymeric composition with a matrix polymer to form a matrix polymer composition; and
   (f) foaming the matrix polymer composition into nanofoam having a porosity of at least 60 percent.

2. The process of claim 1, further characterized by the flame retardant in step (a) being a halogen-free flame retardant.

3. The process of claim 1, further characterized by the flame retardant being aluminum tris (2-(diethyoxyphosphoryl) acetate).

4. The process of claim 1, where the fluid polymer composition of step (b) is a latex of polymer particles in a continuous aqueous phase.

5. The process of claim 4, further characterized by the polymer particles of the latex in step (b) being miscible with the matrix polymer of step (e).

6. The process of claim 4, further characterized by the polymer particles of the latex and the matrix polymer being selected from acrylate polymers.

7. The process of claim 4, further characterized by removing water and, if present, solvent in step (d) at pressure and temperature conditions under which the flame retardant is a solid and the polymer particles in the latex do not indistinguishably coalesce.

8. The process of claim 1, further characterized by foaming the matrix polymer composition in step (f) by pressurizing a mixture of carbon dioxide and the matrix polymer composition under temperature and pressure conditions so that the carbon dioxide dissolves in the polymer matrix to form a foamable polymer composition and then depressurizing the foamable polymer composition at a rate of at least 100 megaPascals per second to cause the foamable polymer composition to foam.

* * * * *